United States Patent [19]

Ohnishi et al.

[11] Patent Number: 4,768,183
[45] Date of Patent: Aug. 30, 1988

[54] OPTICAL REPRODUCING APPARATUS

[75] Inventors: Kunikazu Ohnishi, Yokohama; Akira Arimoto, Musashimurayama; Masayuki Inoue, Yokohama; Yukio Fukui, Machida, all of Japan

[73] Assignee: Hitachi, Ltd., Tokyo, Japan

[21] Appl. No.: 87,345

[22] Filed: Aug. 20, 1987

[30] Foreign Application Priority Data

Aug. 29, 1986 [JP] Japan ................................ 61-201427

[51] Int. Cl.$^4$ ............................................. G11B 7/085
[52] U.S. Cl. ...................................... 369/112; 369/46; 369/120
[58] Field of Search ...................................... 369/44–46, 369/109, 112, 120; 350/162.2, 162.23, 162.24

[56] References Cited

U.S. PATENT DOCUMENTS

| | | | |
|---|---|---|---|
| 4,223,348 | 9/1980 | Oinoue et al. | 369/112 |
| 4,458,980 | 7/1984 | Ohki et al. | 369/112 |
| 4,484,072 | 11/1984 | Matsumura | 350/162.23 |
| 4,592,038 | 5/1986 | Kubota et al. | 369/46 |
| 4,624,526 | 11/1986 | Tsukai et al. | 369/109 |

*Primary Examiner*—Donald McElheny, Jr.
*Attorney, Agent, or Firm*—Antonelli, Terry & Wands

[57] ABSTRACT

Light beam emitted from a laser light source is focused by an objective lens and applied in this state to an optical information recording medium. In the optical path between the laser light source and the objective lens is disposed a diffraction grating inclinedly with respect to the optical axis. This diffraction grating not only reflects the light beam emitted from the laser light source but also separates it into zero order as well as +1st order and −1st order diffracted light beams. Thus, this diffraction grating functions not only as a diffraction grating but also as a mirror. The thus-separated light beams are applied to an optical disc and the reflected light beams from the optical disc are converted to electric signals by means of a photo detector. The ±1st order diffracted light beams are used as track servo beams for following the track on the disc. The zero order diffracted light beam is used for reproducing information signals provided from the track on the disc. The diffraction grating has unequally spaced, curvilinear grooves in order to solve the problems of wave front aberration and light spot aberration which are induced by letting the diffraction grating function as both a diffraction grating and a mirror.

7 Claims, 7 Drawing Sheets

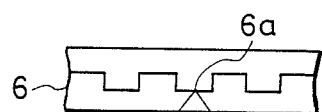
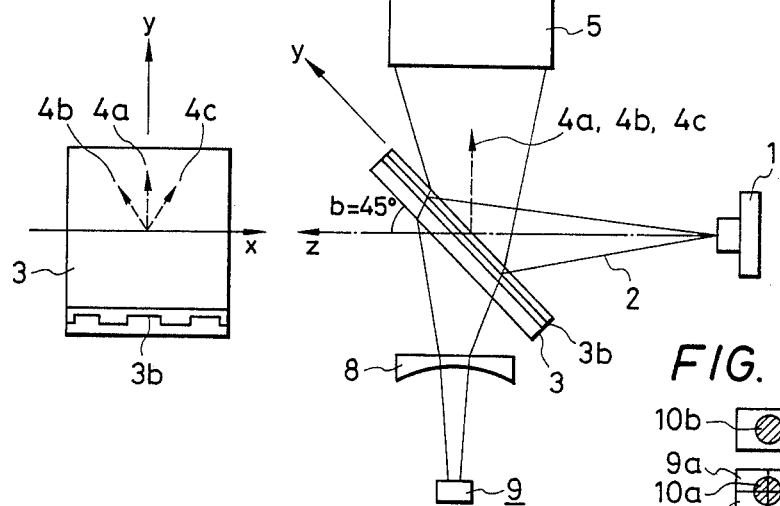
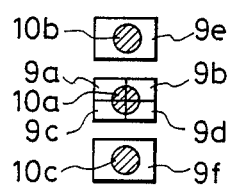
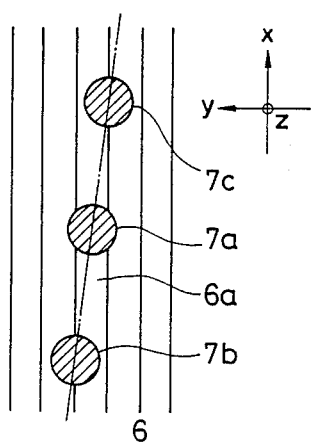
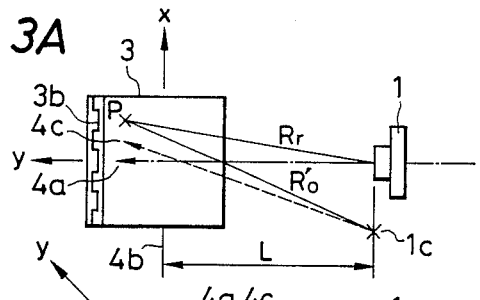
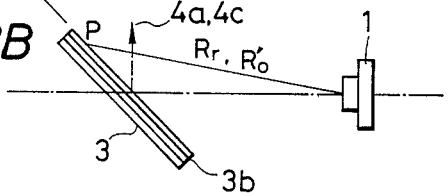

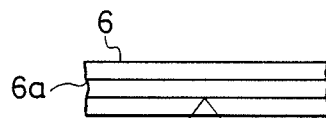
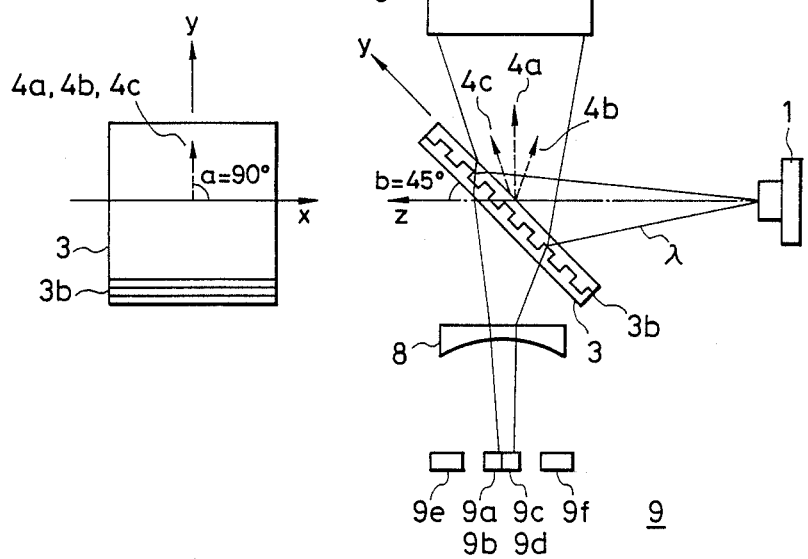
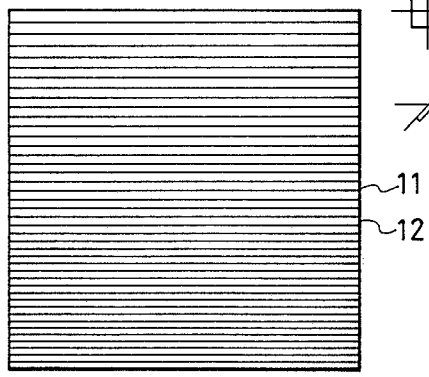
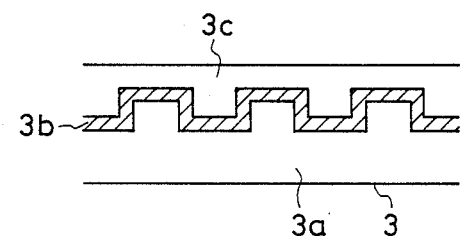

OPTICAL REPRODUCING APPARATUS

BACKGROUND OF THE INVENTION

The present invention relates to an optical reproducing apparatus which performs a three beam type tracking error detection and particularly to an optical reproducing apparatus suitable for the simplification of an optical construction thereof.

Heretofore, as a three beam type tracking error detecting means there has been known, for example, such a construction as shown in U.S. Pat. No. 4,592,038 in which a diffraction grating having an equally spaced, rectilinear groove pattern is disposed in an optical path between a semiconductor laser beam source and a beam splitter perpendicularly to the optical axis. According to such conventional arrangement, it is possible to effect the detection of tracking error using a simple optical system. However, there has been the problem that two special optical components are needed, one being a beam splitter for the separation of light beam incident on an optical information recording medium (hereinafter referred to as the "optical disc") and light beam reflected from the optical disc, and the other being a diffraction grating for separating incident light into three beams.

In view of the above problem the present inventors have made studies about a new optical element as an integration of both such beam splitter and diffraction grating to reduce the number of components used. According to this new optical element, a beam splitter film is formed on the groove portion of a reflection type diffraction grating, whereby not only light beam incident on the optical element is separated into reflected light beam and transmitted light beam, but also the reflected light beam is separated into zero order light beam and ±1st order light beams.

But in the use of such an integrated optical element of a beam splitter and a diffraction grating, it became clear that there arose the following problem. Since its grooved side is disposed inclinedly relative to the optical axis, ±1st order diffracted light beams increase in wave front aberration in such a conventional diffraction grating as has an equally spaced, rectilinear groove pattern, resulting in that the spots of the ±1st order light beams applied onto an optical disc are markedly deteriorated in their focused condition.

SUMMARY OF THE INVENTION

It is the object of the present invention to provide a diffraction grating having an optimum groove pattern capable of improving the wave front aberrations of ±1st order diffracted light beams.

The present invention employs a diffraction grating having grooves of unequally spaced curves. Such an unequally spaced curvilinear diffraction grating is obtained in the following manner. ±1st order diffracted light beams generated by the diffraction grating are regarded as light beams generated from virtual light sources independent of each other, and a predetermined offset is given to the position of each such virtual light source, then in this condition the emitted light beams from those light sources are allowed to interfere on the diffraction grating, and grooves are formed in the positions of interference fringes of even numbers out of the resulting interference fringes.

By using a reflection type diffraction grating having the thus-formed unequally spaced curvilinear grooves, as will be mentioned later, wave front aberration generated in each of ±1st order diffracted light beams and relative aberrations of light spots can be remedied to about the same or even greater extent as compared with conventional optical reproducing apparatus in which a diffraction grating and a beam splitter are provided as separate components. As a result, it becomes possible to practically use a new optical element comprising a beam splitter and a diffraction grating which are integral with each other.

BRIEF DESCRIPTION OF THE DRAWINGS

FIGS. 1A, 1B and 1C are block diagrams showing an embodiment of the present invention;

FIG. 2 is a schematic diagram showing radiated positions of light spots;

FIGS. 3A, 3B, 4, 5, 6 and 7 are schematic diagrams for explaining how to prepare a holographic diffraction grating embodying the invention as well as the performance thereof;

FIGS. 13A, 13B and FIG. 14 are a block diagram and a shematic diagram, respectively, showing a still further embodiment of the invention; and FIG. 15 is a sectional view for explaining the structure of the diffraction grating of the present invention.

DESCRIPTION OF THE PREFERRED EMBODIMENTS

Figure 4:
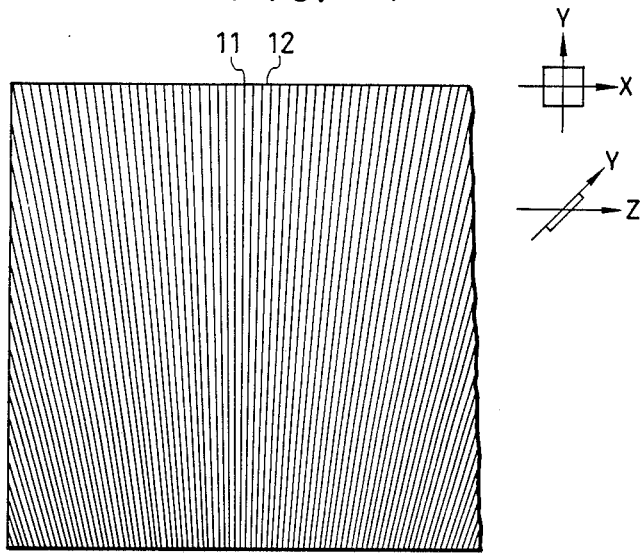

An embodiment of the present invention will be described hereinunder with reference to FIG. 1.

FIGS. 1A, 1B and 1C are block diagrams showing an optical system of an optical reproducing apparatus using the diffraction grating of the present invention. FIG. 1B is a side view of a diffraction grating 3 shown in FIG. 1A, and FIG. 1C is a plan view of a photo detector 9 shown in FIG. 1A.

Light beam 2 emitted from a semiconductor laser light source 1 is incident on a reflection type diffraction grating 3 which is disposed inclinedly relative to an optical axis (Z axis). In FIG. 1, the reflection type diffraction grating 3 is inclined approximately 45° with respect to the optical axis. The reflection type diffraction grating 3 is internally provided with concave and convex type grooves and has a beam splitter surface 3b formed thereon. The present invention is characteristic in the groove pattern of the diffraction grating 3, but the details thereof will be described, later herein.

When the emitted light beam 2 incident on the reflection type diffraction grating 3 is reflected by the concave and convex type beam splitter surface 3b, it is separated into a zero order light beam 4a, a +1st order diffracted light beam 4b and a −1st order diffracted light beam 4c in a plane parallel to the X axis in FIG. 1. These light beams pass through an objective lens 5 and are then focused onto an optical disc 6 separately from one another. At this time, as shown in FIG. 2, the light beams 4a, 4b and 4c focused on the optical disc 6 from light spots 7a, 7b and 7c on the same recording track 6a of the optical disc 6, the light spots 7a, 7b and 7c being focused in a file somewhat inclinedly with respect to the extending direction of the recording track. Then, reflected light beams of the light spots 7a, 7b and 7c from the optical disc 6 travels back through the objective lens 5, then passes through the reflection type diffraction grating 3 and further through a concave lens 8, and enters the photo detector 9. For example, as shown in FIG. 1C, the photo detector 9 is divided into six regions of 9a, 9b, 9c, 9d, 9e and 9f. Reflacted light beam 10a of the zero order light beam 4a from the optical disc 6 enters the regions 9a, 9b, 9c and 9d, and a focusing error of the light spot 7a is detected according to an astigmatic method on the basis of a difference signal between the sum of output signals from the regions 9a and 9d and the sum of output signals from the regions 9b and 9c. Incident on the remaining two regions 9e and 9f are reflected light beams 10b and 10c of the ±1st order diffracted light beams 4b and 4c separately from the optical disc 6, and on the basis of a difference signal between output signals from both regions there is detected a tracking error of the light spot 7a. Such a tracking error detecting means is generally called a three-beam method. An information signal recorded on the optical disc 6 is detected, for example, on the basis of the sum of output signals from the regions 9a, 9b, 9c and 9d.

In the above optical system it is necessary that the reflection type diffraction grating 3 be disposed in the emitted light beam 2 inclinedly about 45° with respect to the optical axis. Therefore, in a diffraction grating having an equally spaced, rectilinear groove pattern such as that used in conventional optical reproducing, there occurs wave front aberration in ±1st order diffracted light beams 4b and 4c separated by the diffraction grating. In the case where a diffraction grating having such an equally spaced, rectilinear groove pattern as that used in the aforementioned prior art is used as the reflection type diffraction grating 3 shown in FIG. 1 and disposed inclinedly about 45° with respect to the optical axis, the amount of the wave front aberration induced in the ±1st order diffracted light beams 4b and 4c becomes as large as ½ wavelength or more in terms of root mean square (rms) value, so that it becomes no longer possible to direct the light spots 7b and 7c of the ±1st order diffracted light beams accurately onto the optical disc 6. Consequently, in order to realize an optical reproducing apparatus of such an optical system as shown in FIG. 1 it is necessary to newly provide a diffraction grating having a groove pattern capable of minimizing the wave front aberration occurring in the ±1st order diffracted light beams 4b and 4c.

Such wave front aberration occurring in the ±1st order diffracted light beams can be diminished by using an unequally spaced, curvilinear grating (hereinafter referred to as "curvilinear grating") prepared according to a groove pattern making technique in a diffraction grating called a holographic diffraction grating. In the curvilinear grating, the ±1st order diffracted light beams separated by the diffraction grating are regarded as emitted light beams from light sources set virtually, and concave or convex groove portions are provided in the positions of interference fringes which are induced upon overlapping on the diffraction grating 3 of the light beam emitted from one such virtual light source and the light beam 2 emitted from the actual laser light source 1.

FIG. 3A is a front view for explaining the principle of a groove pattern preparing method for the curvilinear grating, and FIG. 3B is a plan view thereof. As shown in FIGS. 3A and 3B, if an optical distance between an arbitrary point P and the laser light source 1 is Rr and an optical distance between a virtual light source 1c of the −1st order light beam 4c mentioned above and the point P is $R_0'$, $$R_0' - R_r = m \cdot \lambda \quad (1)$$

wherein λ represents the wavelength of laser light and m represents any integer. By providing either a convex or a concave groove portion in the position of point P which satisfies the relationship of the equation (1), there is obtained a curvilinear grating which separates predetermined ±1st order diffracted light beams 4b and 4c. A curvilinear grating having the same performance as in the above method is obtainable even when groove is formed in the position of interference fringe between the light beam emitted from a virtual light source 1b for the +1st order diffracted light beam 4b and the light beam 2 from the laser light source 1. FIG. 4 shows an example of groove pattern obtained in the manner described above. In FIG. 4, for example, a black band 11 represents a concave groove portion and a white band 12, a convex groove portion, or vice versa.

Figure 5:
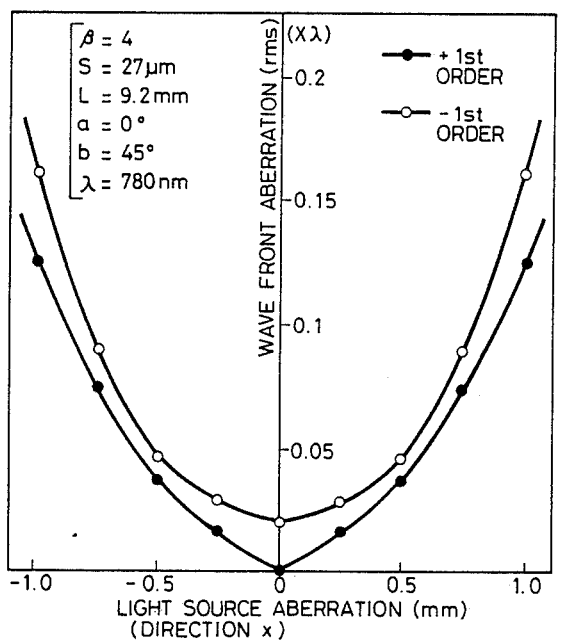

Referring now to FIG. 5, there are shown wave front aberrations (rms values) occurring in the ±1st order diffracted light beams in the case where such a curvilinear grating as shown in FIG. 4 is used as the reflection type diffraction grating 3 shown in FIG. 1.

The axis of abscissa in FIG. 5 represents the amount of light source aberration or dislocation in the X axis direction in FIG. 1.

As is apparent from FIG. 5, by using a curvilinear grating having a groove pattern prepared using such a relationship as represented by the foregoing equation (1), the amount of wave front aberration induced can be greatly decreased as compared with that in the use of the conventional equally spaced, rectilinear diffraction grating. For example, when the amount of dislocation is 0.5 mm, the wave front aberration is only 0.04 rms.

On the other hand, however, the use of such curvilinear grating as the reflection type diffraction grating 3 shown in FIG. 1 involves the problem that the light spots 7a, 7b and 7c of the zero order light beam 4a and ±1st order diffracted light beams 4b, 4c on the optical disc 6 are not formed on the same straight line, thus resulting in deterioration of the tracking error detecting accuracy for the light spot 7a according to the three-beam method. This point will be explained below using FIGS. 6 and 7.

Figure 6:
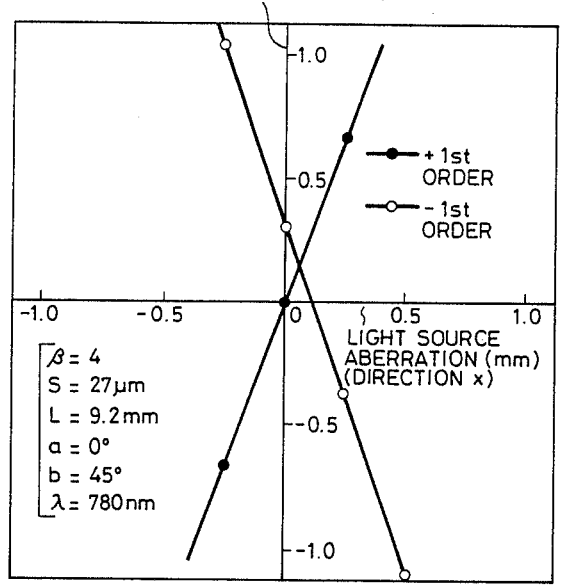

FIG. 6 shows changes in the amount of aberration radially of the optical disc 6 from ideal positions of the ±1st order diffracted light spots 7b and 7c applied onto the optical disc 6 in the case of using the curvilinear grating shown in FIG. 4 as the reflection type diffraction grating 3. The axis of abscissa in FIG. 6, like FIG. 5, represents the amount of light source aberration in the X axis direction in FIG. 1.

Figure 7:
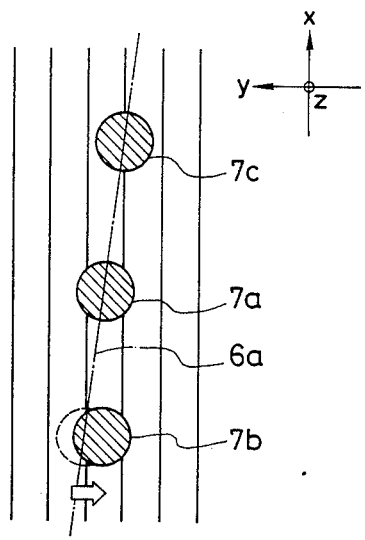

As shown in FIG. 6, if the foregoing curvilinear grating is used as the reflection type diffraction grating, the light spot 7b of the +1st order diffracted light beam 4b deviates 0.3 μm or so from its ideal position radially of the optical disc. More particularly, as shown in FIG. 7, out of the light spots 7a, 7b and 7c so designed as to be located at equal intervals on a straight line which crosses the recording track 6a of the optical disc 6 obliquely thereabove, only the light spot 7b of the +1st order diffracted light beam 4b deviates in the radial direction of the optical disc 6, resulting in that the three optical spots 7a, 7b and 7c are no longer aligned.

Such light spot aberration causes tracking offset in the use of the three-beam method which detects a tracking error of the light spot 7a on the basis of an output signal indicative of a difference in the amounts of reflected light beams of the ±1st order diffracted light spots 7b and 7c from the optical disc 6.

On the other hand, a diffraction grating according to another embodiment of the present invention can realize both the aforementioned decrease of wave front aberration and ensuring the rectilinearity of light spot applied positions on the optical disc. The following description is now provided about concrete principles of such diffraction grating with reference to FIGS. 8A, 8B to FIG. 13.

Figure 8A:
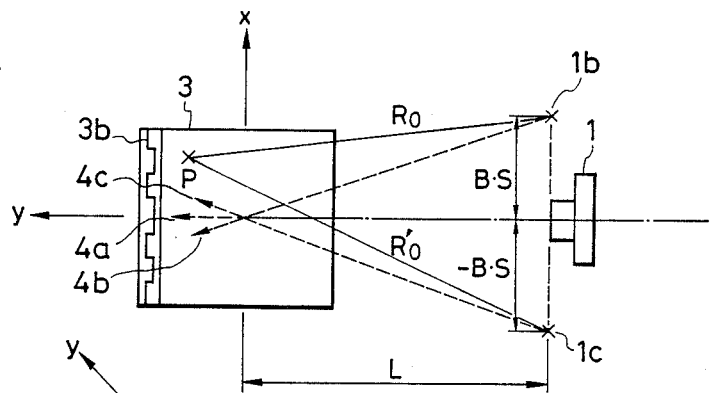
FIGS. 8A, 8B, 9, 10A, 10B, 10C, 10D, 11 and 12 are schematic diagrams for explaining the performance of a diffraction grating according a further preferred embodiment of the invention.
Figure 8B:
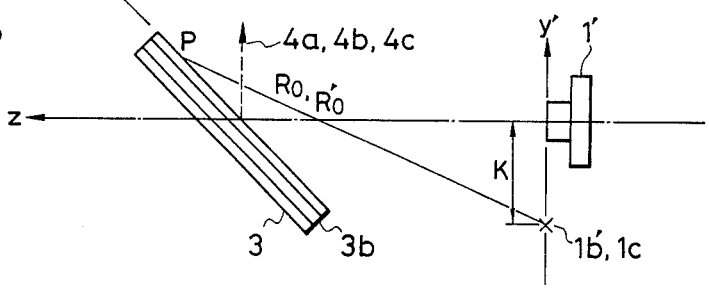

FIG. 8A is a front view for explaining how to prepare a groove pattern of the diffraction grating, and FIG. 8B is a plan view thereof. In the diffraction grating of the invention, in order to eliminate relative aberrations of the ±1st order diffracted light spots 7b and 7c occurring in the use of the foregoing curvilinear grating, either concave or convex groove portions are provided in the positions of interference fringes of even numbers out of interference fringes created upon overlapping on the diffraction grating 3 of both light beams respectively from the virtual light sources 1b and 1c of ±1st order diffracted light beams. In this case, as shown in FIG. 8B, the virtual light sources 1b and 1c of ±1st order diffracted light beams are offset a predetermined distance K in the y' direction shown in the same figure to calculate an interference fringe pattern. For example, in the case where the diffraction grating of the present invention is used as the diffraction grating 3 in an optical system of such construction as shown in FIG. 1, a and b may be set at 0° and 45° respectively in the equation described in the scope of claim if an optical distance from the virtual light source 1b to the point P on the diffraction grating 3 and that from the virtual light source 1c to the point P are $R_0$ and $R_0'$, respectively.

Thus, $$(R_0 - R_0')/2 = m \cdot \lambda \tag{2}$$

Provided, $$R_o = \sqrt{(x - \beta \cdot S)^2 + \left(\frac{y}{\sqrt{2}} - K\right)^2 + \left(\frac{y}{\sqrt{2}} + L\right)^2} \tag{3,a}$$

$$R_o' = \sqrt{(x + \beta \cdot S)^2 + \left(\frac{y}{\sqrt{2}} - K\right)^2 + \left(\frac{y}{\sqrt{2}} + L\right)^2} \tag{3,b}$$

$$K = \beta^2 \cdot S^2 / 2L \tag{3,c}$$

Figure 9:
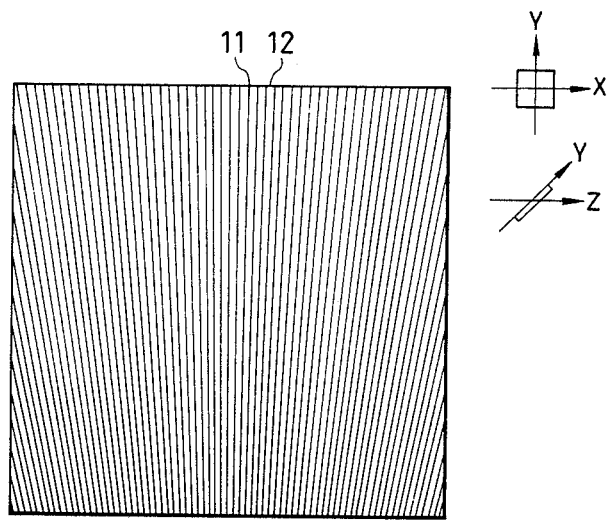
Figure 10A:
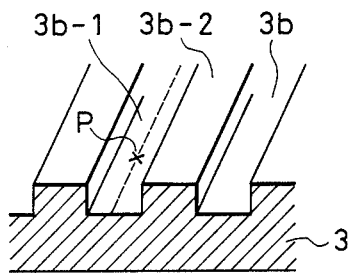
Figure 10B:
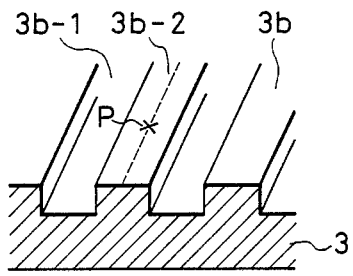
Figure 10C:
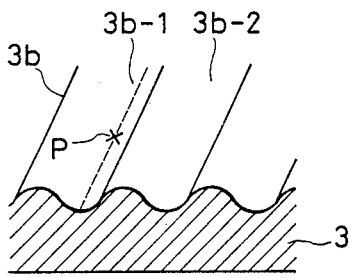
Figure 10D:
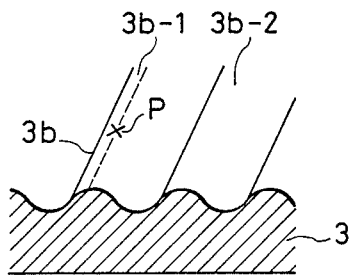

The diffraction grating of the invention is obtained by providing a concave or convex groove portion at point P of coordinates (x, y) satisfying the relationship of the above equation (2). In FIG. 9 there is shown an example of groove pattern of the diffraction grating of the invention which has been calculated using the equation (2). In FIG. 9, the block bands are a series of points of coordinates (x, y) satisfying the equation (2). In the actual grating, the groove 3b is formed so that an approximately central part 3b-1 of the concave portion of the groove 3b which is generally rectangular is located in the position P of the said coordinates (x, y), as shown in FIG. 10A, or an approximately central part 3b-2 of the convex portion of the groove 3b occupies such position, as shown in FIG. 10B. The groove 3b may be in a generally sinusoidal shape as shown in FIGS. 10C and 10D.

For example, where the diffraction grating of the present invention having a groove pattern prepared in the manner described above is used as the reflection type diffraction grating 3 shown in FIG. 1, a complex amplitude distribution $U_{+1}(x, y)$ of the ±1st order diffracted light beam 4b separated by the diffraction grading 3 is represented by the following equation:

$$U + 1(x, y) = e^{i\left\{\omega t - \frac{2\pi}{\lambda} T(x, y)\right\}} \tag{4}$$

In the above equation, $\omega$ represents an angular frequency of light beam, and $T(x, y)$, which represents a spatial phase distribution of the +1st order diffracted light beam 4b, is written as follows:

$$T(x,y) = R_T + (R_o - R_o')/2 = \tag{5}$$

$$\sqrt{x^2 + \left(\frac{y}{\sqrt{2}}\right)^2 + \left(\frac{y}{\sqrt{2}} + L\right)^2} +$$

$$\frac{1}{2}\left\{\sqrt{(x - \beta \cdot S)^2 + \left(\frac{y}{\sqrt{2}} - K\right)^2 + \left(\frac{y}{\sqrt{2}} + L\right)^2} - \right.$$

$$\left. \sqrt{(x + \beta \cdot S)^2 + \left(\frac{y}{\sqrt{2}} - K\right)^2 + \left(\frac{y}{\sqrt{2}} + L\right)^2}\right\} \approx$$

$$\sqrt{(x - \beta \cdot S)^2 + \left(\frac{y}{\sqrt{2}}\right)^2 + \left(\frac{y}{\sqrt{2}} + L\right)^2} - \frac{K}{L}y +$$

$$\sqrt{x^2 + \left(\frac{y}{\sqrt{2}}\right)^2 + \left(\frac{y}{\sqrt{2}} + L\right)^2} -$$

$$\frac{1}{2}\left\{\sqrt{(x - \beta \cdot S)^2 + \left(\frac{y}{\sqrt{2}} - K\right)^2 + \left(\frac{y}{\sqrt{2}} + L\right)^2} + \right.$$

$$\left. \sqrt{(x + \beta \cdot S)^2 + \left(\frac{y}{\sqrt{2}} - K\right)^2 + \left(\frac{y}{\sqrt{2}} + L\right)^2}\right\}$$

$$(\because K < L)$$

The second term et seq. in the equation (5) represents a wave front aberration of the +1st order diffracted light beam 4b. This wave front aberration may be written as follows in terms of W(x, y) by Taylor's expansion of the second term et seq. of the above formula and ignoring an infinitesimal amount of higher order:

$$W(x,y) \approx \frac{\beta^2 \cdot S^2}{2L}\left(\frac{\beta^2 \cdot S^2}{2L^2} - 1\right) + \tag{6}$$

$$\left(\frac{\beta^2 \cdot S^2}{2L^2} - \frac{K}{L}\right)y +$$

$$\frac{\beta^2 \cdot S^2}{2L^3}\left(\frac{3}{2}x^2 + y^2\right) + \cdots \quad 5$$

Figure 11:
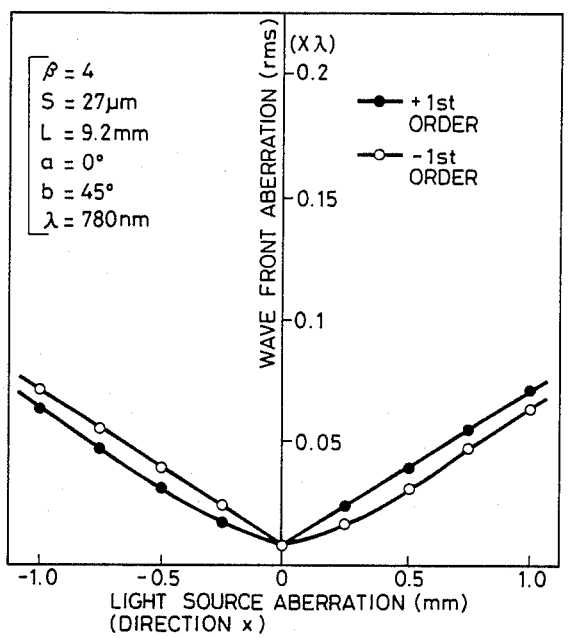
Figure 12:
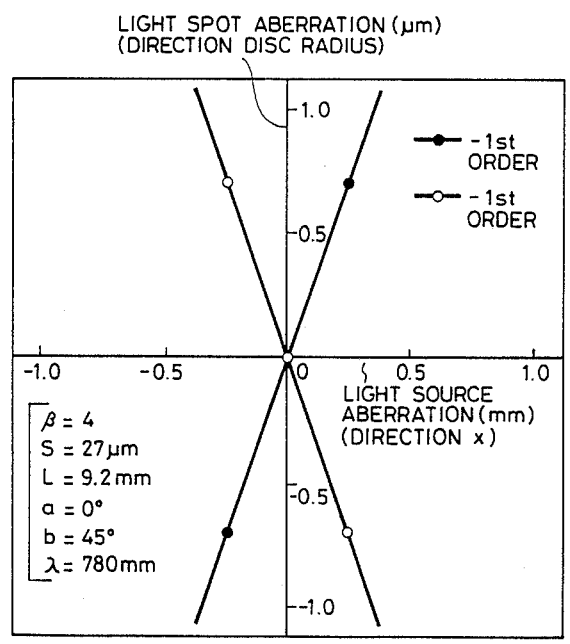

In the equation (6), a first order coefficient of y is actually zero because the constant K is set equal to $\beta^2 \cdot S^2/2L$. This indicates that there is no aberration of the +1st order diffracted light spot 7b in the y direction, namely, in the radial direction of the optical disc 6 in such optical system construction as shown in FIG. 1. The above principle also applies to the −1st order diffracted light beam 4c and its light spot 7c in just the same manner. And the wave front aberration of the −1st order diffracted light beam 4c is also expressed in just the same manner as the equation (6). FIG. 11 shows amounts (rms values) of wave front aberrations in the case of using the diffraction grating of the present invention as the reflection type diffraction grating 3 in such optical system as shown in FIG. 1. FIG. 12 shows amounts of aberrations of the ±1st order diffracted light spots 7b and 7c in the radial direction of the optical disc 6 from ideal positions. The axes of abscissa in FIGS. 11 and 12, like FIGS. 4 and 5, represent the amount of aberration of the laser light source 1 in the X axis direction in FIG. 2.

As in apparent from FIGS. 11 and 12, when there is no aberration of the laser light source 1, the amounts of wave front aberration of the ±1st order diffracted light beams 4b and 4c are both kept below the wavelength of 1/100 and there is no aberration of the light spots 7b and 7c. Further, even in the case of aberration of the laser light source 1, the aberrations of the ±1st order diffracted light spots 7b and 7c in the radial direction of the optical disc 6 are completely opposite to each other and the absolute values of their quantities become equal to each other. This indicates that the light spots 7a, 7b and 7c on the optical disc 6 are always in alignment even under light source aberration. More specifically, according to diffraction grating of this invention, even though in the case of aberration of the laser light source 1, by taking measures to rotate the whole optical reproducing apparatus about the optical axis, it is possible to completely remove such tracking offset as in the use of the foregoing general curvilinear grating. Although in FIGS. 11 and 12 there are shown only the amount of wave front aberration on the x aberration of the laser light source 1 in FIG. 1 and the amount of light spot aberration, there will be obtained the same effect as in the x aberration no matter in which direction the laser light source 1 may undergo aberration.

FIGS. 13A and 13B are block diagrams showing a further embodiment of the present invention, FIG. 13B being a side view of a diffraction grating 3 shown in FIG. 13A, in which the same components as in the embodiment of FIG. 1 are indicated by the same reference numerals. This embodiment shows an example in which incident light beam is separated into a zero order light beam 4a, a +1st order diffracted light beam 4b and a −1st order diffracted light beam 4c in a direction perpendicular to the embodiment of FIG. 1, namely, in a plane parallel to the y axis illustrated. In the case where the foregoing curvilinear grating is used as the reflection type diffraction grating in an optical system of such construction, light spots 7b and 7c undergo aberrations in the circumferential direction of the optical disc 6. Therefore, this embodiment employs an expression of relation obtained by substituting a=90° and b=45° in the equation recited in the scope of claim, as a design expression for the reflection type diffraction grating 3. That is, the following equation serves as a relationship for determining the position (x, y) of groove:

$$(R_0 - R_0')/2 = m \cdot \lambda \quad (7)$$

Provided, $$R_o = \sqrt{x^2 + \left(\frac{y}{\sqrt{2}} - \beta \cdot S - K\right)^2 + \left(\frac{y}{\sqrt{2}} + L\right)^2} \quad (8,a)$$

$$R_o' = \sqrt{x^2 + \left(\frac{y}{\sqrt{2}} + \beta \cdot S - K\right)^2 \left(\frac{y}{\sqrt{2}} + L\right)^2} \quad (8,b)$$

$$K = \beta^2 \cdot S^2/2L \quad (8,c)$$

FIG. 14 shows an example of a phase groove pattern prepared according to the above equation.

The direction in which the ±1st order diffracted light beams are separated, namely, the direction of alignment of the light spots 7a, 7b and 7c, is not limited to the one illustrated in the above embodiment. Any design equation for the diffraction grating 3 is obtained by substituting a corresponding angle "a" into the equation recited in the scope of claim.

Lastly, a concrete construction of the diffraction grating of the present invention as well as an example of how to prepare it will be described. As shown in FIG. 15, the reflection type diffraction grating 3 of the present invention is prepared by forming concave and convex grooves according to the relationship shown above on one side of a base plate 3a which is a flat glass or plastic plate, then forming thereon a half mirror film 3b constituted by a dielectric multi-layer film or a metallic film by vapor deposition or any other suitable method, and further forming thereon an optical plastic layer 3c having a refractive index close to that of the base plate 3a. Concrete examples of the optical plastic layer 3c include ultraviolet ray curable acrylic resins. Even among thermosetting type resins and non-reactive resins there are included some which are applicable.

Using the diffraction grating 3 of such construction is advantageous in that the diffraction grating 3 can also serve as a beam splitter and the ±1st order diffracted light beams 4b and 4c can be generated separatedly only when the light beam 2 is reflected from the diffraction grating.

As set forth hereinabove, by using the reflection type diffraction grating having a groove pattern of the present invention, the amounts of wave front aberrations of the ±1st order diffracted light beams can be decreased to a great extent and it is possible to completely remove relative aberrations of the ±1st order diffracted light spots. Consequently, it is made possible to effect practical use of an optical element having a beam splitter film formed on the grooves of the reflection type diffraction grating to give an integral construction of beam splitter and diffraction grating, thus greatly contributing to the reduction in the number of components of optical reproducing apparatus.

We claim:

1. In an optical reproducing apparatus including:
   a laser light source;
   an objective lens for focusing a light beam emitted from said laser light source and applying it in a focused state to an optical information recording medium;
   a diffraction grating disposed in an optical path between said laser light source and said objective lens inclinedly with respect to an optical axis, said diffraction grating functioning to reflect the light beam emitted from the laser light source, separate the emitted light beam into zero order, +1st order and −1st order diffracted light beams and conduct said diffracted light beams to said objective lens; and
   a photo detector for converting light beams reflected from said optical information recording medium into electric signals,
   the improvement characterized in that said diffraction grating has unequally spaced, curvilinear grooves.

2. An optical reproducing apparatus according to claim 1, wherein said unequally spaced, curvilinear grooves of said diffraction grating are formed in the positions of interference fringes of even numbers out of interference fringes obtained by regarding +1st and −1st diffracted light beams generated by said diffraction grating as being light beams emitted from virtual light sources independent of each other, then giving a predetermined offset to the position of each said virtual light source and allowing light beams emitted in this condition from said virtual light sources to interfere on said diffraction grating.

3. An optical reproducing apparatus according to claim 1, wherein each concave or convex portion of said unequally spaced, curvilinear grooves of said diffraction grating is positioned in coordinates (x, y) satisfying the following relationship, said x-y coordinates being set by letting an intersecting point of a grooved plane and the optical axis be an origin and letting an axis in said grooved plane and perpendicular to the optical axis be an x axis and further letting an axis perpendicular to said x axis in said plane be a y axis:

$$(R_0 - R_0')/2 = m \cdot \lambda$$

provided, $$R_o = \sqrt{(x - Sx)^2 + (Y - Sy - K)^2 + (Z + L)^2}$$

$$R_o' = \sqrt{(x + Sx)^2 + (Y - Sy - K)^2 + (Z + L)^2}$$

$$Sx = \beta \cdot S \cdot \cos \alpha$$

$$Sx = \beta \cdot S \cdot \cos \alpha$$

$$Sy = \beta \cdot S \cdot \sin \alpha$$

$$K = (Sx^2 + Sy^2)/2L \tan b$$

$$Y = y \sin b$$

$$Z = y \cos b$$

where,
$\beta$: reciprocal of lateral magnification of the objective lens
S: spacing between zero order light spot and ±1st order diffracted light spots on the optical information recording medium
L: optical distance between the diffraction grating which is a reflection type and the laser light source
a: angle between a straight line joining the zero order diffracted light spot and the ±1st order diffracted light spots on the optical information recording medium and the direction of the x axis on said recording medium
b: angle between the grooved plane of the reflection type diffraction grating and light beam incident on said diffraction grating
$\lambda$: wavelength of the laser light source
m: any integer.

4. An optical reproducing apparatus according to claim 3, wherein said "a" and "b" are 0° and 45°, respectively.

5. An optical reproducing apparatus according to claim 3, wherein said "a" and "b" are 90° and 45°, respectively.

6. An optical reproducing apparatus according to claim 3, wherein said "a" and "b" are both 45°.

7. An optical reproducing apparatus according to claim 1, wherein said photo detector comprises three detecting portions disposed on a straight line, of which the central detecting portion is divided in four.

* * * * *